July 30, 1940.   G. F. RUOPP   2,209,540

PRESSURE GAUGE ADJUSTING DEVICE

Filed May 20, 1938

Inventor
George F. Ruopp,
by Orwig & Hague
Attys

Patented July 30, 1940

2,209,540

UNITED STATES PATENT OFFICE 2,209,540

PRESSURE GAUGE ADJUSTING DEVICE

George Frederick Ruopp, Marshalltown, Iowa, assignor to Marshalltown Manufacturing Company, Marshalltown, Iowa, a corporation of Iowa Application May 20, 1938, Serial No. 209,046

1 Claim. (Cl. 74—586)

This invention relates to pressure gauges of the Bourdon tube variety and especially gauges for recording the higher pressures.

It is well known to gauge manufacturers that during the manufacture and assembly of these gauges, variations occur in the several parts so that when assembled and tested under pressure it frequently occurs that the indicator hand does not accurately register with the scale printed upon the dial, and manufacturers generally provide some means for making such readjustments. However, when such accurately adjusted gauges are shipped, handled and installed, and after continued use, it frequently happens that the indicator hand does not accurately register with the dial.

The object of my invention is to provide simple, durable and inexpensive means whereby an unskilled operator may readily, quickly and accurately readjust the indicator hand relative to the dial without in any manner decreasing the accuracy of the gauge after such readjustment.

In the accompanying drawing Figure 1 shows a vertical central sectional view of the gauge casing having my improved gauge therein;

Figure 4:
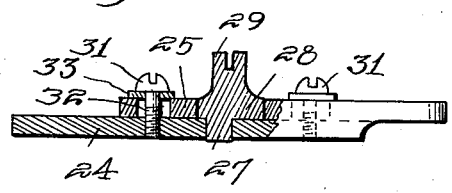
Figure 4 shows an enlarged detail view, partly in section, showing the expansible link.
Figure 5:
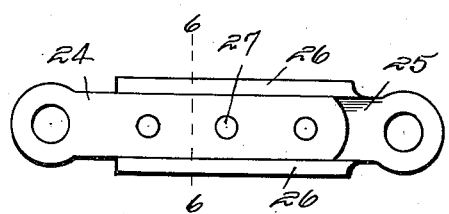
Figure 5 is the rear elevation of same.
Figure 3:
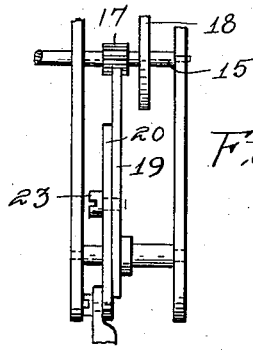
Figure 3 shows a detail side view of the indicator hand-operating mechanism taken on the line 3—3 of Figure 2.
Figure 6:
Figure 6 shows a sectional view on the line 6—6 of Figure 5.
Figure 2:
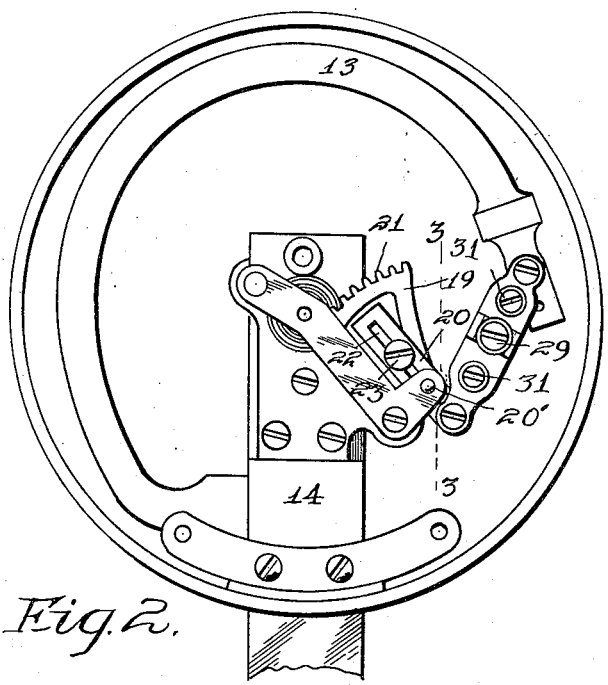
Figure 2 shows a front elevation of same with the gauge front removed.

My invention is intended for use in connection with pressure gauges of the kind employing Bourdon tubes, and these gauges customarily have a casing 10, with a detachable glass front 11 and a detachable metal plate 12 spaced rearwardly from the glass front, and a Bourdon tube fixed to one end of the stationary member 14, at the end of which the fluid under pressure to be gauged is admitted in the ordinary manner not shown.

For the purpose of visually recording pressure within the Bourdon tube these gauges customarily are equipped with a rotatable shaft 15 to which the indicating hand 16 is fixed. On the shaft 15 is a pinion 17 and the usual hair spring 18.

For actuating the pinion 17 there is usually provided a lever 19, pivotally supported at 20' and having a sector 21 in mesh with the pinion 17. Slidingly mounted upon the lever 19 is a lever member 20 having a slot 22 to receive the set screw 23 for adjustably securing the parts 19 and 21 together.

Figure 1:
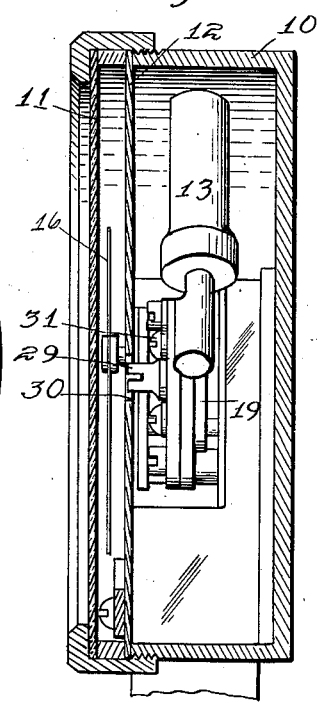

For the purpose of connecting the Bourdon tube with the sector 11 I have provided a device comprising a link member 24 and a link member 25, the latter being provided with side members 26 to engage the edges of the link member 25 and permit longitudinal movement of the links and to prevent lateral movement of the links relative to each other. In the link 24 I have mounted a rotatable shaft 27, and on this shaft is an eccentric 28, and on the eccentric is a slotted screw-head 29. The eccentric 28 is rotatably mounted within a suitable opening formed in the link member 25, and the screw head 29 preferably is extended through an opening 30 in the plate 12, as shown in Figure 1, so as to be readily accessible to an operator upon removal of the glass front only.

For the purpose of holding the link members 24 and 25 in their various positions of adjustment relative to each other I have provided the screws 31 seated in the link 24 and extended through slots 32 in the link member 25, with washers 33 on said screws.

In practice it is well known that where these gauges are manufactured and assembled in large quantities there is considerable variation in, to illustrate, the curvature of the Bourdon tube when not under pressure, and there is also some variation in the mechanism connecting the Bourdon tube with the indicator hand, with the result that upon testing the assembled gauges it is frequently necessary to readjust the position of the indicator hand relative to the zero mark on the gauge. This is frequently done after such testing by mechanism such as the adjustable member 20 of the sector lever 19, and this is usually done during the assembling and by skilled operators.

In practice I have found that during shipment, handling and installation, and also after extensive use, it frequently occurs that the position of the indicating hand relative to the gauge scale is not at the zero mark where no pressure is applied to the gauge, hence, all of the readings on the gauge are correspondingly inaccurate. I have demonstrated in practice that with my improvement, and in the event of the inaccurate adjustment of the indicating hand, an unskilled operator may readily and easily remove the glass front of the gauge, and with an ordinary screw driver adjust the eccentric to thereby lengthen or shorten the link, and thereby bring the indicator hand to the zero mark, after which the readings on the gauge will be just as accurate throughout its entire range as when originally constructed.

I have found also in actual practice that when the two parts of the link are originally assembled and installed they will hold the link members against any such sliding movements relative to each other as are likely to occur in practice, and I have also found that when the eccentric is turned to readjust the length of the link, no attention need be paid by the operator to the screws which normally hold the links in position, and that an operator with an ordinary screw driver can very readily and easily effect such movement of the eccentric as is necessary to bring the indicator hand back to the zero mark on the dial.

I claim as my invention:

An adjustable link, comprising a link member having a bearing opening therein, a second link member resting upon the first link member and formed with a longitudinally arranged slot, a screw passed through said slot and seated in the first link member for frictionally holding the two link members together against normal pressures and permitting one to slide longitudinally relative to the other when excessive pressure is applied, and an eccentric within said bearing opening and rotatably mounted in the second link member, whereby a rotation of the eccentric will either lengthen or shorten the link, which may be done without adjustment of said screw.

GEORGE FREDERICK RUOPP.